June 30, 1970 L. W. WIGHTMAN 3,518,467
TOTALLY ENCLOSED FAN-COOLED ELECTRIC MOTOR
Filed Nov. 4, 1968 2 Sheets-Sheet 2
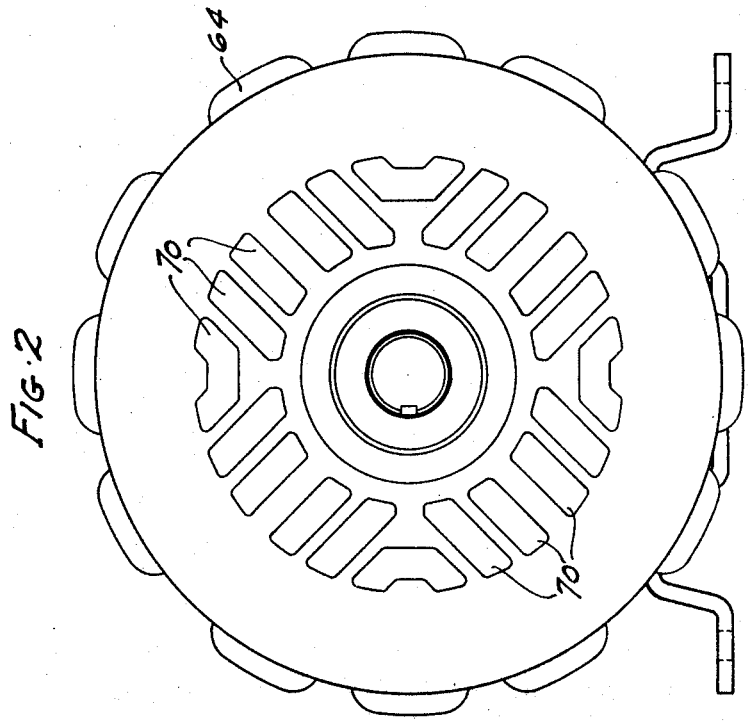
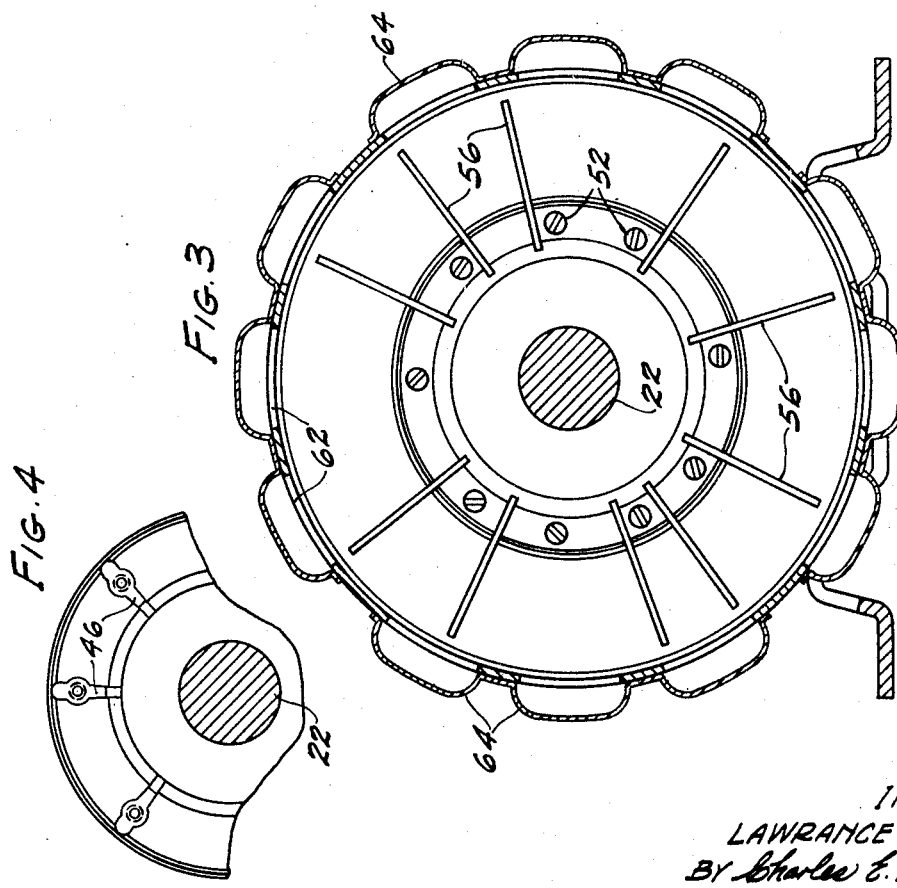
INVENTOR
LAWRANCE W. WIGHTMAN
BY Charles E. Markham
HIS AGENT United States Patent Office 3,518,467
Patented June 30, 1970

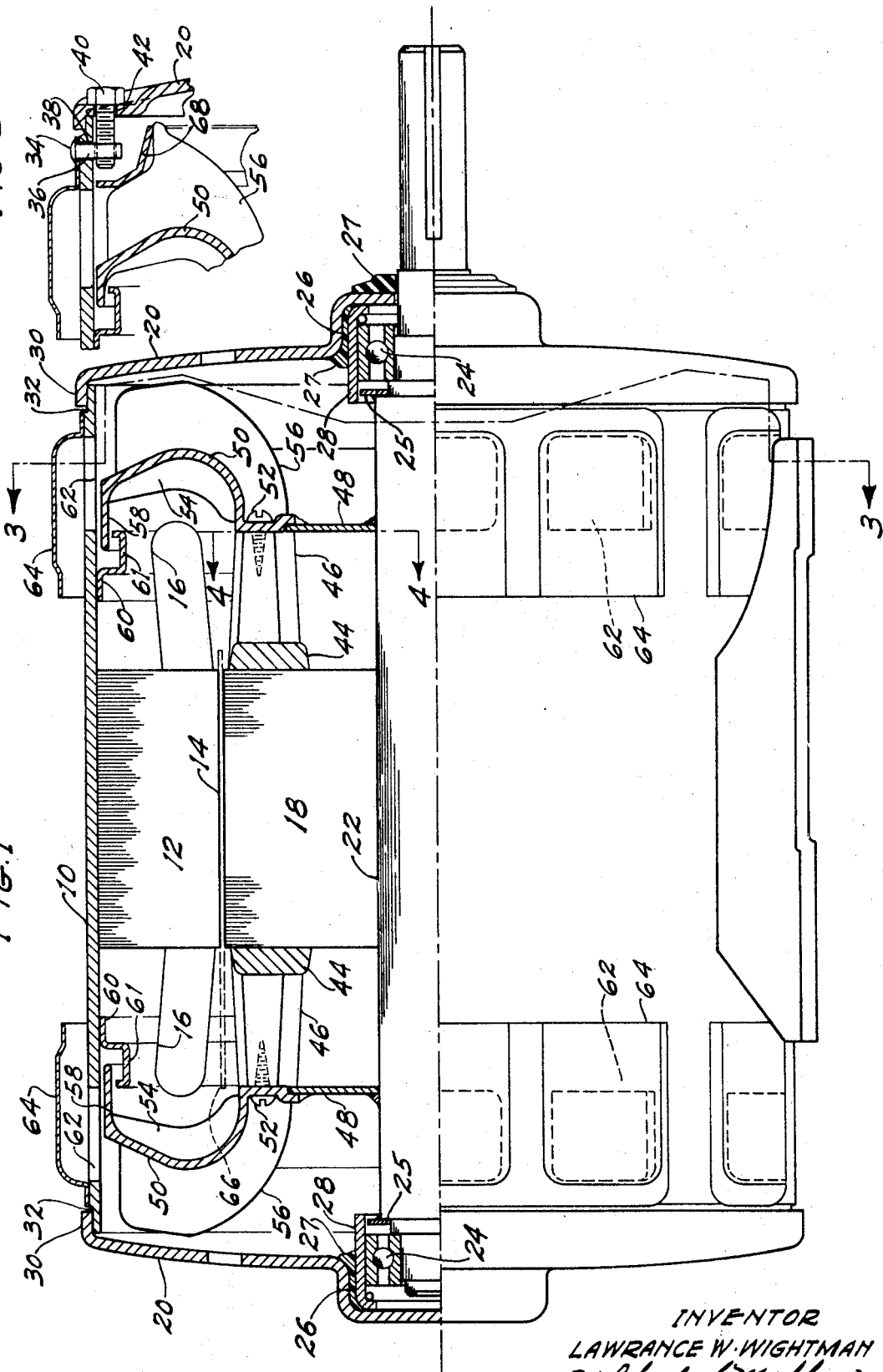

3,518,467
TOTALLY ENCLOSED FAN-COOLED ELECTRIC MOTOR
Lawrence W. Wightman, Creve Coeur, Mo., assignor to Emerson Electric Co., St. Louis, Mo., a corporation of Missouri
Filed Nov. 4, 1968, Ser. No. 773,004
Int. Cl. H02k 9/06
U.S. Cl. 310—63                                    10 Claims

ABSTRACT OF THE DISCLOSURE

A totally enclosed, fan-cooled, electric motor in which end walls enclosing the rotor and stator rotate with the rotor and have a running seal with the interior surface of a cylindrical casing, in which vented end shields spaced axially outward from the rotating walls and fixed to the casing ends journal the rotor shaft, in which interior vanes on the rotating walls circulate air interiorly, in which exterior vanes on the rotating walls pass ambient air at high velocity over the exterior surfaces of the rotating walls and outwardly through vents in the casing wall, and in which deflectors at both ends direct the air emerging from the casing axially inward over the exterior of the casing.

---

This invention relates generally to dynamoelectric machines and particularly to a highly effective air cooling system for totally enclosed electric motors.

Heretofore, constructions of totally enclosed, fan-cooled, electric motors have conventionally included a completely enclosed casing having imperforate, fixed, end walls journalling the rotor shaft with radial vanes at the ends of the rotor for circulating air within the casing. These constructions have further included cooling fins on the inexterior of the casing, a vented housing attached to one end of the casing and enclosing a rotor-driven blower, and deflector means for moving ambient air axial-over the exterior surface of the casing wall.

These constructions have been considerably less effective in removing heat from the stator, rotor, and casing than freely vented fan-cooled constructions. As a result, they have been substantially more expensive than freely vented constructions, due in great part to the fact that more active material per horsepower output was required.

The primary object of the present invention is to provide an electric motor construction incorporating a greatly improved air cooling system and meeting the service requirements of totally enclosed, fan-cooled motors.

A further object is to provide a generally new and improved, totally enclosed, fan-cooled, electric motor construction embodying a double end, air-cooling system.

More specifically, it is an object to provide a totally enclosed, air-cooled, motor construction in which casing end walls enclosing the rotor and stator rotate with the rotor and have a running peripheral seal with the casing, in which vented end shields spaced axially outward from the rotating enclosing walls and fixed to the ends of the casing support the rotor shaft, in which vanes on the interior side of the rotating enclosing walls circulate air interiorly, in which vanes on the exterior side of the rotating enclosing walls pass ambient air at high velocity over the exterior surfaces of the rotating enclosing walls and outwardly through vents in the casing wall near its ends, and in which deflectors direct the air emerging from the casing vents axially over the exterior surface of the casing from both ends.

Further objects and advantages will become apparent from the following description of a form of the present invention, when read in connection with the accompanying drawings.

In the drawings:
FIG. 1 is a half sectionalized side elevational view of an A.C. electric motor constructed in accordance with the present invention;
FIG. 2 is an end elevational view of the motor shown in FIG. 1;
FIG. 3 is a transverse sectional view taken along line 3—3 of FIG. 1;
FIG. 4 is a fragmentary sectional view taken along line 4—4 of FIG. 1; and
FIG. 5 is a fragmentary sectional view showing an alternate method of attaching the end shields to the stator casing.

Referring now to the drawings in more detail, the illustrated form of electric motor, constructed in accordance with the present invention, includes a cylindrical casing 10 into which a laminated stator core 12, having a circular periphery, is fitted and fixed therein by any suitable means. The stator core has a bore 14 and winding end turns, the outlines of which are indicated at 16. The motor further includes a rotor 18 rotatably mounted in the stator bore 14. The casing 12 extends axially outward from the ends of the rotor and stator and beyond the winding end turns. Connected to each end of casing 12 is an end shield 20. The rotor 18 includes a shaft 22 having ball bearings 24 fixed on end portions thereof, which ball bearings are supported in internal central recesses 26 formed in the end shields 20.

The ball bearings 24 are entered in slip fit relationship into bearing locating rings 28, and the bearing locating rings are loosely received in the recesses 26 and cemented therein with an adhesive structural cement 27, which is applied in soft paste form and subsequently hardened to rigidly fix the locating rings 28 in the end shield recesses. The end shields 20 have short, axially extending, peripheral, rim portions 30 which nicely fit over machined surfaces 32 at the ends of casing 10. The end shields are rigidly fixed at their peripheries to the ends of casing 10 by an adhesive cement applied in liquid form to the joint between the surfaces of rim portions 30 and machined surfaces 32 after the end shields are assembled. The cement, in liquid form, is distributed over the entire surfaces of the peripheral joints by capillarity and is heat hardened to securely fix the end shields on the casing.

These peripheral cemented joints between the end shield rim portions 30 and machined surfaces 32 can, however, be broken and the end shields removed to permit repairs to be made during manufacture or, later, by repair shops equipped with suitable tools. The end shields may again be re-cemented to the casing after repairs are made.

An alternate method of detachably securing the end shields to the ends of casing 10 is shown in FIG. 5. In this method, removable nuts 34 having rectangular shank portions 36 are entered radially into the casing 10 through peripherally spaced, rectangular holes 38 in the casing wall near its ends. The nuts 34 receive in screw threaded engagement similarly spaced bolts 40 passing through clearance holes 42 in the end shields 20. This arrangement, while providing more convenient detachment and reassembly of the end shields than the arrangement shown in FIG. 1, is, however, somewhat higher in cost. The method of attaching the end shields to the casing shown in FIG. 1 is, in general, the preferred method employed in smaller size motors while that shown in FIG. 5 is the generally preferred method employed in larger size motors.

The rotor is provided with cast end rings 44 from which integrally formed radial vanes 46 extend axially outward. A pair of rotating end walls consisting of centrally perforated sheet metal discs 48 cemented to shaft 22 and cast annuluses 50 attached to the ends of vanes 46 by screws 52 and having a close running fit at their peripheries with the wall of casing 10 enclose the stator and rotor.

The annuluses 50 have integrally cast radial vanes 54 projecting perpendicularly from the inner surfaces thereof and integrally cast radial vanes 56 projecting perpendicularly from the outer surfaces thereof. The annuluses 50 are provided with axially inward extending peripheral rim portions 58, and the casing is provided with a pair of ring members 60 suitably attached to the wall thereof and having axially extending portions 61 spaced from the wall and overlapping the peripheral rim portions 58 of the annuluses, thereby to form a labyrinth seal.

The casing 10 is provided with a plurality of perforations 62 spaced around the wall thereof near each end between the running peripheral seal of the annuluses 50 and the end shields 20. Overlying these perforations 62 are louvres 64 which serve both as drip-proof covers and as deflectors which direct air issuing from the perforations 62 axially inward over the exterior surface of casing 10.

In assembling the motor, the stator core 12 is inserted and fixed in the casing 10. The rotor 18 with ball bearings 24 fixed on shaft 22 is then inserted into the stator bore 14 and temporarily fixed therein axially and concentrically by suitable, circularly spaced, removable shims, indicated at 66. The bearing locating rings 28 are now slipped on the outer bearing races and cement 27, in paste form, is applied to the outer surfaces thereof. The end shields 20 are then moved axially into position with their peripheral rims 30 fitted on machine casing surfaces 32. As the end shields are moved axially into this position, the cement is spread over the outer surface of the locating rings 28 and over the axial walls of recesses 26, there being sufficient cement applied to solidly fill the annular space between the loosely fitting locating rings and the walls of the recesses. The cement 27 is now hardened by suitable application of heat, thereby rigidly fixing the locating rings in the recesses 26 in alignment with shaft 22 and concentric with the stator bore. Heat is now applied to the cement 27 to harden it and fix the bearing locating rings 28 rigidly in end shield recesses 26.

One end shield and the adjacent annulus 50 is now removed to permit axial withdrawal of the shims 66. After the shims are withdrawn the annulus 50 is replaced and attached with screws 52, and the end shield is replaced in its assembled position on the casing. An epoxy resin cement in thin liquid form is now applied by suitable means to the joints between the end shield rims 30 and the surfaces 32 of the casing. The cement is a commercially available liquid form of synthetic resin which disperses over the joined surfaces by capillarity. Finally, heat is applied in a suitable manner to set and harden this cement, thereby to rigidly attach the end shields to the casing.

This cemented joint, between the end sields and casing, may, however, be broken without damage to the associated parts to permit repairs and may then be replaced and re-cemented with the use of suitable tools available at the point of manufacture or in repair shops.

When the end shields are attached to the casing by bolting, as shown in FIG. 5, the removable nuts 34 and bolts 40 require the outer corners of vanes 56 to be cut off for clearance, leaving a space in which flow-retarding turbulence would likely occur. To overcome this, a baffle ring 68, attached in any suitable manner to vanes 56, is provided to deflect flow from this space.

The ball bearings 24 are provided with inner sealing members comprising thin centrally perforated discs 25 slipped on and fixed on shaft 22 in sealing engagement in any suitable manner and having a close running fit at their peripheries in bearing locating rings 28. The sealing members 25 are positioned axially just slightly inward from the ends of locating rings 28. In this arrangement, dripping moisture will be deflected to the shaft, and moisture accumulating on the sealing members 25 or adjacent portions of the shaft will be thrown outward by centrifugal force. An outer seal 27 of rubber-like material surrounds the externally projecting shaft portion at one ends of the motor. The seal 27 is attached to the end shield in any suitable manner and has a slip fit on shaft 22. At the other end of the motor, the bearing is enclosed by the imperforate wall portion of the end shield.

In operation, air is circulated by interior vanes 46 and 54 at high speed and passes over the end faces of the stator and rotor, around and over the winding end turns 16, over the interior surfaces of the discs 48 and the annuluses 50 which form the rotating closure walls, and over the exposed interior surface portion of the casing. Heat generated in the stator, rotor, and windings is, therefore, transferred to the rotating end walls and to end portions of the casing wall. Heat is also transferred from the stator core to the central portion of the casing wall by conduction.

Ambient air is drawn in through vents 70 in the end shields 20 and moved radially outward at high speed by vanes 56, passing over the exterior surfaces of the rotating enclosing walls formed by discs 48 and annuluses 50 and exiting through casing openings 62. The emerging air is then directed axially inward from both ends over the exterior surface of the casing 10. The vanes 54 and 56, besides functioning as blower vanes, also function as fins to substantially increase the surface area of the rotating enclosing walls, thereby to expedite heat transfer. While the annuluses 50 may be constructed in any suitable manner, some advantage in heat transfer may be gained by casting them with integral vanes of some metal, such as aluminum, having a relatively high rate of thermal conductivity.

The louvres 64 may be formed in multiples, as indicated in FIG. 3, each spanning an opening 62, or the louvres may be constructed so as to span more than one opening. The louvres may be attached to the casing 10 in any suitable manner, such by cementing. It has been found through experimentation that greater cooling of the exterior surface of the casing 10 is effected when the louvres 64 are arranged so that their openings are in axial alignment than is effected when they are staggered.

Numerous modifications of the illustrated embodiment of the invention will occur to those skilled in the art, and the exclusive use of modifications within the scope of the appended claims is contemplated.

I claim:

1. In an electric motor, a hollow, cylindrical casing, a stator fitted in said casing having a periphery continuously contiguous with the wall of said casing, a rotor mounted for rotation in said stator, said rotor including a shaft extending from both ends thereof, said casing extending axially from both ends of said stator and rotor, a perforated end shield fixed to each end of said casing and journalling the ends of said rotor shaft, an imperforate wall in each end portion of said casing spaced axially from the ends of said stator and rotor and from said end shields, said walls being connected to said rotor for rotation therewith and said walls extending radially from siad shaft to peripheral, axially extending, rim portions having a close running fit with the interior surface of said casing, said rotating walls having circularly arranged, radially extending vanes on both surfaces thereof, said casing having circularly spaced perforations in the end portions thereof between the inner edges of said rim portions and said end shields, and exterior means at each end of said casing for deflecting air issuing from said casing perforations axially inward over the exterior of said casing.

2. An electric motor as set forth in claim 1 in which said vanes on both sides of said rotating walls coextend radially with a substantial portion of the end forces of said stator.

3. An electric motor as set forth in claim 1 which includes means forming with the wall of said casing an annular, axially extending, interior recess in each end portion of said casing into which said axially extending, peripheral, rim portions of said rotating walls are entered and have a running fit therein, thereby to form a labyrinth seal.

4. An electric motor as set forth in claim 1 which includes circularly arranged radial vanes extending axially outward from each end of said rotor, which vanes coextend radially with a substantial portion of the end faces of said rotor, in which said rotating walls comprise outer annuluses attached to the ends of said rotor vanes and inner disc elements attached to said shaft, and in which said vanes on both sides of said rotating walls are circularly arranged on and extend radially across both sides of said annuluses.

5. An electric motor as set forth in claim 4 in which said annuluses and said vanes on both sides thereof are formed integral as a casting of metal having a high coefficient of heat conductivity.

6. An electric motor as set forth in claim 1 which includes circularly arranged radial vanes extending axially outward from each end of said rotor and coextending radially with outer annular portions of said rotor end faces, in which said rotating walls abut the outer ends of said rotor vanes, in which outer annular portions of said rotating walls coextending with the end faces of said stator have concavo-convex form with the concave sides thereof facing the end faces of said stator and spaced axially outward from the end turns of the stator windings, and in which said circularly arranged radially extending vanes on the insides of said rotating walls substantially extend radially across the concave outer annular portions thereof.

7. In an electric motor, a cylindrical casing, a stator fixed in said casing, a rotor mounted for rotation in said stator, said rotor including a shaft extending from both ends thereof, a perforated fixed wall at each end of said casing journalling the ends of said shaft, said casing being longer than said rotor and stator whereby said fixed walls are spaced from the ends thereof, an imperforate rotating closure wall at each end of said motor between the ends of the stator and rotor and said fixed walls, said rotating closure walls extending radially from said shaft to a periphery having a close running fit with the casing wall, said rotor having end rings formed as castings, including integrally formed, circularly arranged vanes extending axially outward therefrom, said rotating closure walls being connected to said rotor for rotation therewith and being held firmly against the ends of said integrally cast rotor vanes thereby to effect the transfer of heat from said rotor end rings to said rotating walls by conduction, circularly arranged, radially extending vanes on the insides of said rotating walls cooperating with said rotor vanes to circulate air within the enclosure formed by said rotating walls, circularly arranged perforations in said casing near the ends thereof, and circularly arranged vanes on the outsides of said rotating closure walls coextending radially with the end faces of said rotor and said stator and operative to effect the flow of air inward through said perforated, fixed, end walls and radially outward through said casing perforations.

8. An electric motor as set forth in claim 7 in which the angular spacing of said circularly arranged vanes on the insides and outsides of said rotating walls is non-uniform.

9. An electric motor as set forth in claim 7 in which said stator is press fitted into said casing thereby to facilitate heat transfer from said stator to said casing by conduction, and in which means is included on the exterior of said casing near both ends thereof operative to shroud said casing perforations and to deflect air issuing therefrom axially inward over the exterior surface of said casing.

10. An electric motor as set forth in claim 7 in which at least those portions of said rotating walls bearing against the ends of said rotor vanes and extending radially outward therefrom are formed as castings integral with said vanes on the insides and outsides thereof.

References Cited
UNITED STATES PATENTS

| | | | |
|---|---|---|---|
| 1,858,261 | 5/1932 | Barnholdt | 310—63 |
| 2,967,959 | 1/1961 | Waters | 310—63 |

FOREIGN PATENTS 560,135    9/1932   Germany.

DONOVAN F. DUGGAN, Primary Examiner

U.S. Cl. X.R.

310—254